Figure 1:
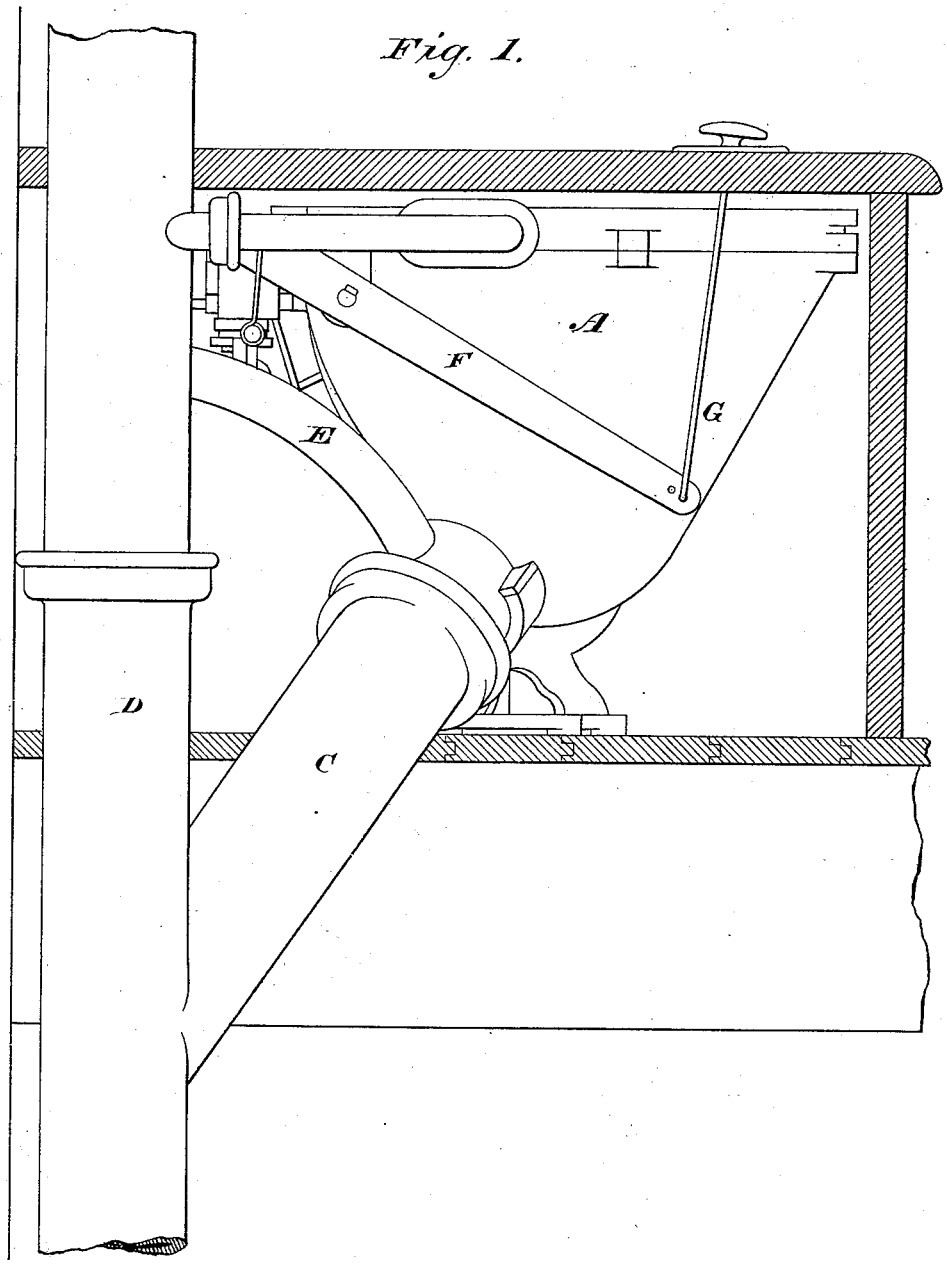

(No Model.) 2 Sheets—Sheet 2.

T. WILSON & C. N. DUTTON.
WATER CLOSET.

No. 280,108. Patented June 26, 1883.

WITNESSES:
Wm. A. Skinkle,
Geo. W. Breck.

By their Attorneys,
Baldwin, Hopkins, & Peyton.

INVENTORS:
Thomas Wilson,
Chauncey N. Dutton,

N. PETERS, Photo-Lithographer, Washington, D. C.

UNITED STATES PATENT OFFICE.

THOMAS WILSON AND CHAUNCEY N. DUTTON, OF WASHINGTON, D. C.

WATER-CLOSET.

SPECIFICATION forming part of Letters Patent No. 280,108, dated June 26, 1883.

Application filed July 19, 1880. Renewed August 30, 1881. Again renewed February 23, 1883. (No model.)

*To all whom it may concern:*

Be it known that we, THOMAS WILSON and CHAUNCEY N. DUTTON, both of the city of Washington and District of Columbia, have invented certain new and useful Improvements in Water-Closets, of which the following is a specification.

Heretofore in all closets except plain hoppers it has been necessary to have an additional bowl or container, either below or at the side of the hopper, for the accommodation of some of the working parts. By our invention we dispense with such additional bowl or container, and support and operate all the working parts successfully in connection with the hopper alone, thus greatly simplifying the construction and reducing the cost of the closet and diminishing the space necessary to accommodate it. At the same time we simplify the connection with the soil-pipe, provide effectually against foul emanations from the closet, and conveniently secure the most perfect ventilation. Our plan of construction of a closet contemplates the employment of a suitable hopper with a discharge-opening at the bottom, preferably slightly in rear of and a little inclined with respect to the center of the hopper. This discharge-opening is provided with a swinging discharge-valve operated by means of an angular or bell-crank lever pivoted in or passing through or over the side of the hopper, at or near the top. In connection with or in continuation of the discharge-opening, we provide a cylindrical outlet extending in an outward and downward direction at an angle of about forty-five degrees, so that it may join with or form a Y-branch or one-eighth bend leading directly into the perpendicular soil-pipe. The soil-pipe may extend up and open out into the air at the top of the building, as is well understood, for purposes of ventilation, and in order to ventilate the Y-connection we provide a short pipe extending from immediately under the discharge-valve upward into the soil-pipe or other ventilating-pipe, thus providing a free opening to the atmosphere from the highest point in the opening immediately under the discharge-valve, so that there will be no tendency or opportunity for emanations to rise through the hopper. By this plan of construction we are able to dispense with an S or other trap beneath the hopper, and to cheaply and surely prevent all emanations into the building. The wash it admitted at the top of the hopper, as is usual, and the discharge-valve in swinging to one side is cleansed by it.

Figure 2:
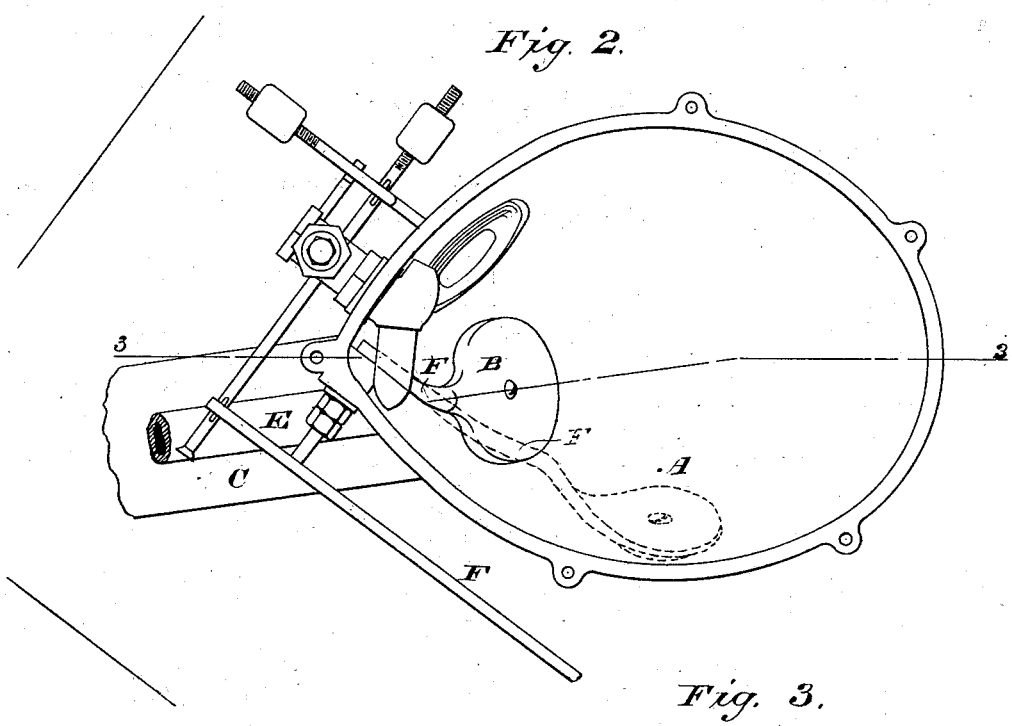
Figure 3:
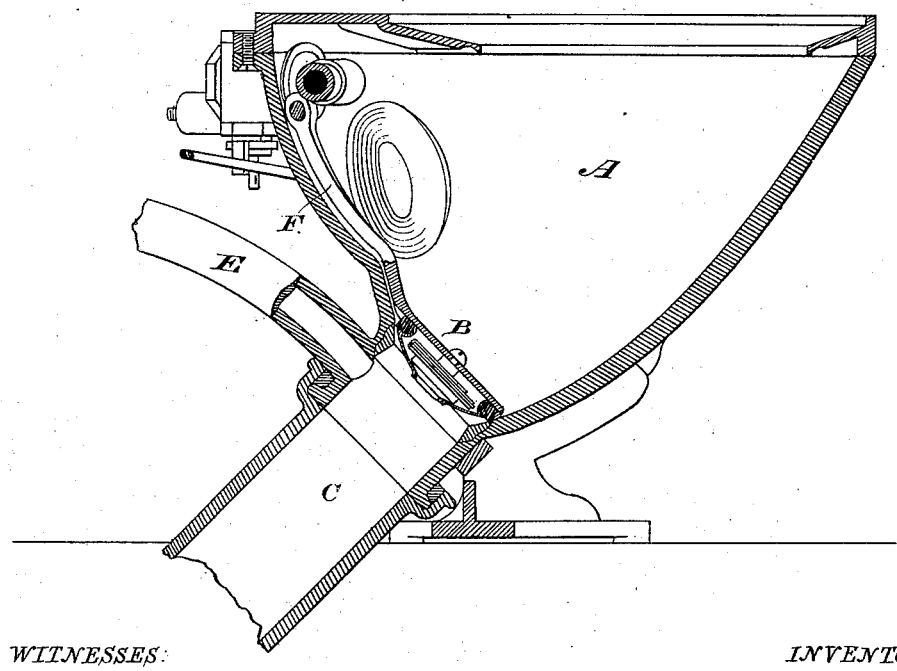

In the accompanying drawings, illustrating our invention, Figure 1 is a side elevation. Fig. 2 is a plan view, and Fig. 3 a vertical central section on line 3 3 of Fig. 2.

A indicates the hopper, supported on a suitable seat or bracket; B, the discharge-valve; C, the Y-connection; D, the soil-pipe; E, the ventilating-pipe, and F the bell-crank lever, pivoted near the top of the hopper and suitably connected with the inlet-valve mechanism, so as to operate it by means of the pull-rod G in the usual way. The bell-crank lever is so shaped and pivoted that the valve will swing upward and sidewise in an oblique direction with respect to the axis of the hopper, as shown in dotted lines in Fig. 2, so as to encounter the wash.

We have illustrated in the drawings suitable inlet-valve apparatus; but as that is no part of our joint invention we do not describe it in detail. It is perhaps necessary to state, however, that it is contemplated that the wash-water shall flow into the hopper in two directions, as is usual, one stream having a greater force than the other, so that the two shall come together at about opposite the position of the discharge-valve mechanism when it is elevated and swung to one side by operation of the pull-rod, as illustrated in dotted lines, Fig. 2. To have the valve swing in this way it is only necessary that the inner arm of the lever be slightly oblique to the bearing of the lever when the bearing is horizontal, as shown in the drawings, and is in the position shown; but every machanic will understand that the position of the bearing and its axial direction may be changed, and that the inner arm of the lever may be accordingly inclined in various ways to accomplish the desired direction of movement of the discharge-valve from its seat, so as to encounter the wash at one side of the hopper, as described. Particular shaping and adjusting of the bell-crank lever to give the valve the direction desired form no part of our invention, and are merely matters of hinging or pivoting the rocking-lever or of inclining its inner arm, or of both, so that it will swing and carry the discharge-valve where it is wanted to be washed. We do not intend to confine ourselves to any particular way of locating or adjusting the bearing of the bell-crank lever with respect to the hopper, or of bending, inclining, or shaping the inner arm of the lever, as these things admit of almost infinite variation while accomplishing the object of properly manipulating the discharge-valve.

Having thus described the construction and mode of operation of our invention, what we claim as new, and desire to secure by Letters Patent, is—

1. In a water-closet having but a single hopper, the combination of the hopper, having a bottom discharge-outlet, with a discharge-valve seated over the discharge-outlet, and an angular lever pivoted in or supported by the upper part of the hopper, and shaped and placed so as to operate the discharge-valve by lifting it within and swinging it to one side of the hopper, substantially as and for the purposes described.

2. The hopper having a bottom discharge-outlet and a cylindrical continuation of the same outward and downward at an angle of about forty-five degrees, in combination with and directly connected with the Y-branch of a soil-pipe, substantially as and for the purposes described.

3. The hopper having a bottom discharge-outlet and a cylindrical continuation of the same outward and downward at an angle of about forty-five degrees, in combination with and directly connected with the Y-branch of a a soil-pipe, the soil-pipe and cylindrical continuation of the hopper being connected by the ventilating-pipe E, substantially as and for the purposes described.

In testimony whereof we have hereunto subscribed our names.

THOMAS WILSON.
CHAUNCEY N. DUTTON.

Witnesses:
MARCUS S. HOPKINS,
JOSEPH I. PEYTON.